(12) United States Patent
Seger (10) Patent No.: US 9,340,370 B2
(45) Date of Patent: May 17, 2016

(54) DEFLECTION DEVICE FOR OBJECTS AND A METHOD FOR DEFLECTING OBJECTS

(71) Applicant: KRONES AG, Neutraubling (DE)

(72) Inventor: Martin Seger, Neumarkt (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/625,524

(22) Filed: Feb. 18, 2015

(65) Prior Publication Data
US 2015/0266678 A1    Sep. 24, 2015

(30) Foreign Application Priority Data

Mar. 19, 2014    (DE) .......................... 10 2014 103 711

(51) Int. Cl.
| B65G 47/53 | (2006.01) |
|---|---|
| B65G 47/66 | (2006.01) |
| B65G 37/00 | (2006.01) |
| B65G 47/76 | (2006.01) |

(52) U.S. Cl.
CPC ............... *B65G 47/53* (2013.01); *B65G 37/00* (2013.01); *B65G 47/66* (2013.01); *B65G 47/763* (2013.01); *B65G 2201/0244* (2013.01)

(58) Field of Classification Search
CPC ...... B65G 37/00; B65G 47/66; B65G 47/763; B65G 47/53
USPC ............................................ 198/453, 457.05
See application file for complete search history.

(56) References Cited

U.S. PATENT DOCUMENTS

| 1,109,284 | A | * | 9/1914 | Friel | ...................... | B65G 47/66 |
|---|---|---|---|---|---|---|
| | | | | | | 198/457.05 |
| 2,912,093 | A | * | 11/1959 | Lauck | .................. | B65G 35/243 |
| | | | | | | 198/449 |
| 3,604,551 | A | | 9/1971 | Fink | | |
| 3,701,407 | A | * | 10/1972 | Kulig | ................... | B65G 47/841 |
| | | | | | | 198/457.05 |
| 4,976,343 | A | * | 12/1990 | Fuller | .................. | B65G 47/682 |
| | | | | | | 198/453 |
| 5,167,319 | A | | 12/1992 | McMackin, Jr. | | |

(Continued)

FOREIGN PATENT DOCUMENTS

| DE | 2508275 A1 | 9/1976 |
|---|---|---|
| DE | 3340088 A1 | 8/1985 |

(Continued)

OTHER PUBLICATIONS

German Search Report for Application No. 102014103711.1, dated Jul. 30, 2014.

*Primary Examiner* — Mark A Deuble
(74) *Attorney, Agent, or Firm* — Marshall, Gerstein & Borun LLP (57) ABSTRACT

A deflection device with an upstream conveyor transports objects on a first transport surface in a first direction of transport to a downstream conveyor which transports objects on a second transport surface in a second direction of transport. The first and the second direction of transport are aligned perpendicular to each other. The first and the second transport surface are substantially coplanar. A downstream assist conveyor, which transports objects on a third transport surface in the second direction of transport. The downstream assist conveyor is disposed alongside of the downstream conveyor and on one side towards the upstream conveyor. The second and the third transport surface are coplanar. Also, a method for deflecting objects using a deflection device.

19 Claims, 6 Drawing Sheets

(56) References Cited

U.S. PATENT DOCUMENTS

| | | | |
|---|---|---|---|
| 5,277,296 A | 1/1994 | Roberts et al. | |
| 5,551,551 A * | 9/1996 | Crawford | B65G 47/682 198/448 |
| 5,850,902 A | 12/1998 | Hicks et al. | |
| 7,198,147 B2 * | 4/2007 | Petrovic | B65G 47/682 198/452 |
| 7,314,130 B2 * | 1/2008 | de Geus | B65G 47/66 198/600 |

FOREIGN PATENT DOCUMENTS

| | | |
|---|---|---|
| DE | 4235369 C1 | 3/1994 |
| DE | 19514928 A1 | 6/1996 |
| DE | 19632376 A1 | 2/1998 |
| EP | 0722896 B1 | 4/1999 |
| JP | H10218322 A | 8/1998 |
| JP | 2002160822 A | 6/2002 |
| JP | 2004323210 A | 11/2004 |
| WO | WO-93/03986 A1 | 3/1993 |

* cited by examiner

DEFLECTION DEVICE FOR OBJECTS AND A METHOD FOR DEFLECTING OBJECTS

CROSS-REFERENCE TO RELATED APPLICATION

The present application claims priority to German Application No. 102014103711.1, filed Mar. 19, 2014. The priority application, DE 102014103711.1, is hereby incorporated by reference.

FIELD OF THE DISCLOSURE

The invention relates to a deflection device for objects according to the preamble of claim 1 and to a method for deflecting objects.

BACKGROUND

DE 196 32 376 A1 discloses a corner station for two separately driven transport devices that meet each other at an angle of about 15° to 175°, where the one transport belt in the transfer region with its deflection roller connects to the other transport belt guided past. The deflection device of the first transport belt in the transfer region extends or is integrated into the second transport belt, where the deflection device is provided, for example, as a deflection roller, wheel or skid. A sliding member is in the transfer region attached to the second transport device and is on its under side towards the first transport device adapted to the course of the belt. The sliding member comprises a narrow or no transfer rail towards the first transport device. If bottles are transferred from the second transport belt to the first transport belt, then a guide rail is provided which transfers the bottles onto the first transport belt. If, however, bottles are transferred from the first transport belt to the second transport belt, then no guide rail is required.

DE 25 08 275 A1 discloses a rectangular arrangement at the same level of single or multi-lane apron conveyors, where the apron belts of the delivery conveyor on their deflection wheels are at the joint of the two conveyors extended to underneath the upper belt of the outer feed apron belt and into a lateral recess of the feed conveyor and the gap at the joint of the two conveyors is bridged by a slide tongue that is narrow relative to the bottle diameters. A rail guides the bottles arriving on the feed conveyor against the gap of the two conveyors bridged by the slide tongue.

EP 0 722 896 B1 discloses a deflection device for transferring articles between conveyors that are aligned transversely. A transfer mechanism is positioned between the upstream and the downstream conveyor, where this mechanism comprises two guide rails extending across the surfaces of the upstream and the downstream conveyor carrying the articles, and a transfer assist conveyor for transferring conveyed articles across the gap between the upstream and downstream conveyor. The transfer assist conveyor is disposed alongside and parallel to the upstream conveyor and moves in the same direction as the latter. The surface of the transfer assist conveyor carrying the articles is coplanar with the surface of the upstream and the downstream conveyor carrying the articles. On the side of the transfer assist conveyor facing the downstream conveyor, so-called attachments can be attached comprising a side plate and an upper plate with a flat upper surface. The underside of an attachment is curved so that the space to be overcome between the upstream and the downstream conveyor can be minimized. Since the transfer assist conveyor runs with the upstream conveyor, the transfer assist conveyor automatically vacates itself at the end of a conveying passage.

These devices can enable good transfer of articles from a first to a second transversely disposed conveyor and prevent any halting during transfer from the first to the second conveyor belt, so that manually vacating the transfer area is not necessary.

However, jamming can occur even with a co-traveling transfer assist conveyor on the feed side when processing sticky PET containers and thereby lead to production down times. Moreover, the curve radius of a guide rail of such a co-traveling transfer assist conveyor is relatively small, so that increased wear of the guide rail can occur.

SUMMARY OF THE DISCLOSURE

A deflection device for a transverse conveyor that allows stable operation while causing the lowest possible wear at the deflection device.

A deflection device for objects such as containers, bottles, jars, cans, comprises an upstream conveyor which is adapted to transport objects on a first transport surface in a first direction of transport and to transfer them to a downstream conveyor. The downstream conveyor is adapted to transport objects on a second transport surface in a second direction of transport, where the first direction of transport and the second direction of transport are aligned perpendicular to each other and where the first transport surface and the second transport surface are substantially coplanar. The deflection device further comprises a downstream assist conveyor which is adapted to transport objects on a third transport surface in the second direction of transport, where the downstream assist conveyor is disposed alongside of the downstream conveyor and on one side towards the upstream conveyor, where the second transport surface and the third transport surface are coplanar.

Having the different transport surfaces respectively be at least substantially coplanar results in the objects having a stable position when being transferred from one transport surface to another transport surface as no great differences in height need to be overcome.

The upstream conveyor, the upstream assist conveyor, the downstream conveyor and the downstream assist conveyor can be formed as endless chains or as endless belts. The upstream conveyor and the downstream conveyor are there each driven by a drive axle and deflected via a deflection axle. In particular the embodiments described farther below can be used for driving the downstream assist conveyor.

The arrangement of the drive axle and the deflection axle is preferably such that the transport surface formed by the conveyor is drawn by the drive axle in the direction of transport. But it can also be provided that the drive axle and the deflection axle are arranged such that the transport surface formed by the conveyor is pushed by the drive axle in the direction of transport.

The downstream assist conveyor, in contrast to arrangements known from the prior art, allows for attenuation of the otherwise almost right-angled area at the inner side of the upstream conveyor and the downstream conveyor. An arc-shaped area or an area with a curved line can be provided.

The transport velocity of the upstream conveyor is preferably equal to or lower than the transport velocity of the downstream conveyor, so that no bottleneck of objects occurs during the transfer and deflection from the first direction of transport to the second direction of transport.

The transport velocity of the downstream assist conveyor can be chosen to be equal to or lower than the transport velocity of the downstream conveyor because the downstream assist conveyor is arranged on the inner side.

A first width of the downstream assist conveyor can be smaller by 50% to 85%, preferably by 50% to 75%, than a second width of the downstream conveyor. The terms "first" and "second" are presently used for distinction of the width of the assist conveyor from the width of the conveyor and otherwise have no restricting effect.

The first width of the downstream assist conveyor can be chosen to be smaller than the second width of the downstream conveyor because the downstream assist conveyor, in particular in the corner region, i.e. on the inner side of an upstream conveyor and the downstream conveyor, of the deflection device is needed for deflecting objects from the first direction of transport to the second direction of transport. In addition, the first width of the downstream assist conveyor should be chosen not too large so that an object from the downstream assist conveyor reaches the downstream conveyor within a reasonable time period.

A first length of the downstream assist conveyor can be 5% to 30%, preferably 10% to 25% and particularly preferably 10% to 20%, of a second length of the downstream conveyor. The terms "first" and "second" are presently used for distinction of the length of the assist conveyor from the length of the conveyor and otherwise have no restricting effect.

The first length of the downstream assist conveyor can be chosen shorter than the second length of the downstream conveyor because the downstream assist conveyor is needed only in the area of the deflection and therefore does not need to extend over the entire length of the downstream conveyor. It is possible to choose the first length of the downstream assist conveyor in dependence of a transport velocity of the downstream assist conveyor and/or the downstream conveyor.

In a first embodiment, the deflection device can further comprise a first drive device of the downstream assist conveyor, which is coupled to a deflection axle of the downstream conveyor by a gear ratio in a range between 1:1 to 1:2, preferably between 1:1 to 1:1.5.

This first embodiment advantageously comprises a second drive device, for example a drive axle, of the downstream conveyor, where the second drive device and the deflection axle are arranged such that the second transport surface comprised by the downstream conveyor is by the second drive device drawn in the second direction of transport. At least one sprocket is arranged at the deflection axle of the downstream conveyor. This provides a torque at the deflection axle that is by the gear ratio coupled to the first drive device of the downstream assist conveyor.

A second embodiment of the deflection device can further comprise a first drive device of the downstream assist conveyor, where a common drive shaft of the upstream conveyor and the upstream assist conveyor is used for or coupling a torque of the downstream assist conveyor, where an extension of one end of the drive shaft is provided beyond a mount and where the extension is via a shaft coupling and an angular gear connected to the first drive device of the downstream assist conveyor. This second embodiment additionally can comprise a second drive device, for example, a drive axle, and a deflection axle of the downstream conveyor, where this second drive device and this deflection axle are arranged such that the second transport surface comprised by the downstream conveyor is by the drive device drawn in the second direction of transport.

A third embodiment of the deflection device can further comprise a first drive device of the downstream assist conveyor, where a drive shaft of the upstream conveyor is used for coupling a torque of the downstream assist conveyor. An angular gear is disposed on the extended common drive shaft of the upstream conveyor and the upstream assist conveyor. The first drive device of the downstream assist conveyor is driven by a gear ratio on a transmission output of the angular gear. The drive shaft can also be a common drive shaft of the upstream conveyor and an upstream assist conveyor.

The transmission and/or gear ratio also provides the advantage that any desired velocity of the downstream assist conveyor can be adjusted in relation to the velocity of the upstream conveyor.

In a fourth embodiment, the deflection device can further comprise a first drive device of the downstream assist conveyor which is coupled to a second drive device of the downstream conveyor by use of a gear ratio of 1:1. The drive axle of the downstream conveyor can thereby also be used for the downstream assist conveyor. In this case, no separate drive device for the downstream assist conveyor is required, and the transport velocity of the downstream assist conveyor and the downstream conveyor are equal.

In a fifth embodiment, the deflection device can further comprise a first drive device of the downstream assist conveyor which is coupled to a second drive device of the downstream conveyor by use of a 1:1.5, 1:2, 1:3, 1:4 or 1:5 gear ratio.

Since the downstream assist conveyor is arranged on the inner side of the deflection device, its transport velocity can be lower than the transport velocity of the downstream conveyor.

In a sixth embodiment, the deflection device can further comprise a first drive device of the downstream assist conveyor which is independent of a second drive device of the downstream conveyor. In the case of this separate drive device for the downstream assist conveyor, an individual and adapted transport velocity of the downstream assist conveyor is possible which can be adapted, for example, to the number of objects, to object dimensions, and the like.

The deflection device can comprise a second downstream assist conveyor which is adapted to transport objects on a fifth transport surface in the second direction of transport, where the second downstream assist conveyor is disposed alongside of the first downstream assist conveyor and on one side towards the upstream conveyor, where the second transport surface and the fifth transport surface are coplanar.

The second downstream assist conveyor allows even better object deflection from the first direction of transport to the second direction of transport because a larger radius for the inner rail on the inner side can be chosen. It is possible to select different transport velocities for each of the two downstream assist conveyors. Assist drives or appropriate gear ratios can be used for the individual downstream assist conveyors.

Furthermore, the deflection device can comprise a static transfer plate in an area between the upstream conveyor with the downstream assist conveyor and the downstream conveyor. The static transfer plate is provided for enabling objects to be transferred from the upstream conveyor to the downstream conveyor or the downstream assist conveyor, respectively, so that a spacing between the upstream conveyor and the downstream conveyor or the downstream assist conveyor, respectively, is bridged thereby. Such bridging is needed for objects with a small bearing surface and/or a downstream conveyor or a downstream assist conveyor, respectively, that each have no small bending radius in the region of the drive axle, so that objects do not get stuck and/or fall over or the like in the area of the spacing and thereby would complicate or prevent continuous transportation and continuous deflection of objects. The width of the transfer plate is advantageously smaller than the base area of the transported objects, so that at least a portion of the base area is always positioned on the upstream conveyor and/or the downstream conveyor or the downstream assist conveyor, respectively.

In another embodiment, the deflection device can further comprise an upstream assist conveyor which is adapted to transport objects on a fourth transport surface in the first direction of transport, where the upstream assist conveyor is disposed alongside of the upstream conveyor and on one side towards the downstream conveyor, where the first transport surface and the fourth transport surface are coplanar.

The deflection device can further comprise an inner rail extending from an inner side of the upstream conveyor to an inner side of the downstream conveyor. Depending on the design of the deflection device, the inner rail there runs a) above the third transport surface of the downstream assist conveyor b) above the third transport surface of the downstream assist conveyor and above the fifth transport surface of the further downstream assist conveyor, c) above the third transport surface of the downstream assist conveyor and above the fourth transport surface of the upstream assist conveyor, d) above the third transport surface of the downstream assist conveyor, above the fifth transport surface of the further downstream assist conveyor and above the fourth transport surface of the upstream assist conveyor, e) above the third transport surface of the downstream assist conveyor and above a surface of the static transfer plate, f) above the third transport surface of the downstream assist conveyor, above the fifth transport surface of the further downstream assist conveyor and above the surface of the static transfer plate.

The inner rail can there have the shape of a circular arc. Due to the configuration as a circular arc, the inner corner area of the deflection device can be eased, meaning the transition from the upstream conveyor to the downstream conveyor is not so abrupt. The inner rail can also be configured as a curved line, more advantageously as a circular line The advantage as compared with prior art is the larger radius. For this, the inner rail extends almost above the corner point between the upstream conveyor or the upstream assist conveyor and the downstream assist conveyor, so that the entire surface of the conveyor can be used for the largest possible radius. It is particularly advantageous to also configure the rail such that only the base area of the container is still on the entire surface of the conveyors and the laterally wider projection of the container in the region above the base surface can already be located outside the conveyor surface.

The deflection device can further comprise an outer rail which extends from an outer side of the upstream conveyor to an outer side of the downstream conveyor and there preferably has the shape of a circular arc, which extends particularly advantageous substantially parallel to the inner rail.

For example, when using an upstream and a downstream assist conveyor with a width of X mm and a rail width of Y mm for the upstream as well as the downstream conveyor, the inner rail can have a radius of X+Y mm and the outer rail a radius of about X+2Y mm.

The outer and/or the inner rail can have a surface which upon contact with the surface of the objects causes only slight friction, so that wear is minimized.

The outer rail can be configured as being co-traveling, advantageously with a velocity equal to the transport velocity of the upstream conveyor. By having the outer rail traveling along, even smaller transfer resistance is ensured. The outer rail can there be formed as an endless belt or as a plurality of driven rolls.

The invention further relates to a method for deflecting objects, such as containers, bottles, jars, with a deflection device as described as above or farther below.

BRIEF DESCRIPTION OF THE SEVERAL VIEWS OF THE DRAWINGS

The accompanying drawings illustrate aspects of the invention by way of example for a better understanding and for illustration purposes. All features described and/or illustrated there are by themselves or in random combination basically subject matter of the invention, regardless of their combination in the claims or their relation. The content of the claims is also made part of the description.

DETAILED DESCRIPTION OF THE PREFERRED EMBODIMENTS

Figure 1:
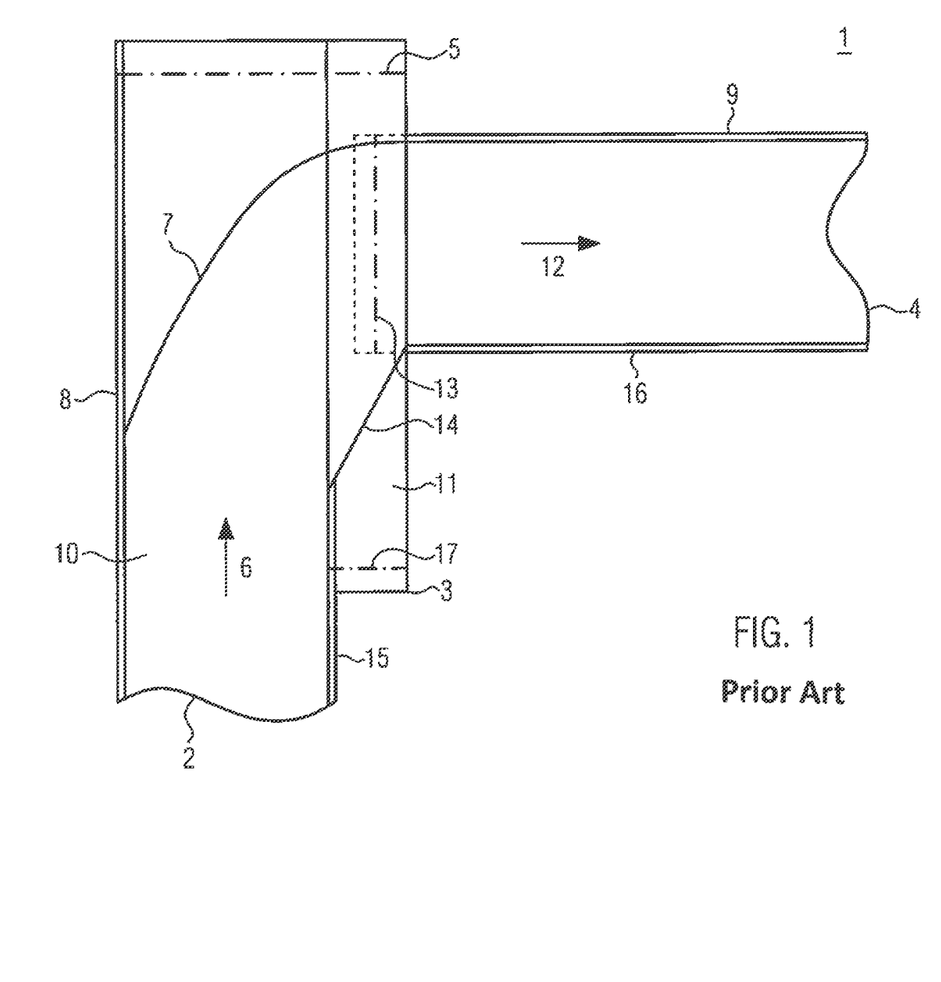
FIG. 1 shows a schematic view of a prior art deflection device.

FIG. 1 shows a deflection device 1 as is known from prior art, comprising an upstream conveyor 2, a transfer plate 3 or an upstream assist conveyor 3, each disposed alongside of the upstream conveyor 2 and additionally on one side towards a downstream conveyor 4. The upstream conveyor 2 can there be a circulating endless belt or a chain. The upstream conveyor 2 is in the illustration driven by drive axle 5. The elements necessary for driving, such as a motor and the like together with the drive axle 5, are also referred to as a drive device. The second axle, around which the endless belt or chain of the upstream conveyor 2 runs, is not shown in FIG. 1. Objects transported from the upstream conveyor 2 in the first direction of transport 6 on the transport surface 10 arrive at the outer rail 7, whereby the objects are guided to the downstream conveyor 4. The outer rail 7 extends from an outer side 8 of the upstream conveyor 2 to an outer side 9 of the downstream conveyor 4, and there runs above the transport surface 10 of the upstream conveyor 2 and above the transport surface 11 of the transfer plate 3 or of the upstream assist conveyor 3, respectively.

The downstream conveyor 4 is disposed at a right angle to the upstream conveyor 2 and transports deflected objects in a second direction of transport 12 which runs perpendicular to the first direction of transport 6. The downstream conveyor 4 can there likewise be a circulating endless belt or a chain. The downstream conveyor 4 is in the illustration driven via a respective drive axle 13. The second axle of the downstream conveyor 4, around which the endless belt or the chain runs, is not shown in FIG. 1.

The static transfer plate 3 or the upstream assist conveyor 3 is additionally provided for objects to be able to be transferred from the upstream conveyor 2 to the downstream conveyor 4, so that a spacing otherwise present between the upstream conveyor 2 and the downstream conveyor 4 can be bridged by the static transfer plate 3 or the upstream assist conveyor 3. Such bridging is needed or desirable, for example, for objects with a small bearing surface and/or a downstream conveyor 4 that has no small bending radius in the region of the drive axle 13, so that objects do not get stuck, fall over and/or the like in the area of such spacing and thereby not complicate or prevent continuous transportation and/or continuous deflection of objects. The inner rail 14 extends from an inner side 15 of the upstream conveyor 2 to an inner side 16 of the downstream conveyor 4, and there runs above the transport surface 10 of the upstream conveyor 2 and the transport surface 11 of the transfer plate 3 or of the upstream assist conveyor 3, respectively.

A static transfer plate 3 advantageously has a width that it is smaller than the smallest linear extension of the base area of the objects to be transported, so that no halting of objects on the transfer plate 3 occurs.

A conveying surface for transporting objects in the deflection device 1 extends between the outer rail 7 and the inner rail 14. The conveying surface therefore comprises portions of the transport surface 10 of the upstream conveyor 2, portions of the transport surface 11 of the transfer plate 3 and portions of the transport surface of the downstream conveyor 4.

If the deflection device 1 known from prior art instead of the static transfer plate 3 comprises an upstream assist conveyor 3, then the latter is configured as an endless belt or as a chain and can be co-driven, for example, via the drive axle 5 of the upstream conveyor 2. The belt or the chain, respectively, also runs over a second axle 17. A separate drive for the upstream assist conveyor 3 can also be provided. The upstream assist conveyor 3 transports objects also in the first direction of transport 6.

This embodiment of the deflection device 1 for transporting objects comprises a conveying surface for the objects extending between the outer rail 7 and the inner rail 14 and portions of the transport surface 10 of the upstream conveyor 2, portions of the transport surface 11 of the upstream assist conveyor 3 and portions of the transport surface of the downstream conveyor 4.

Figure 2:
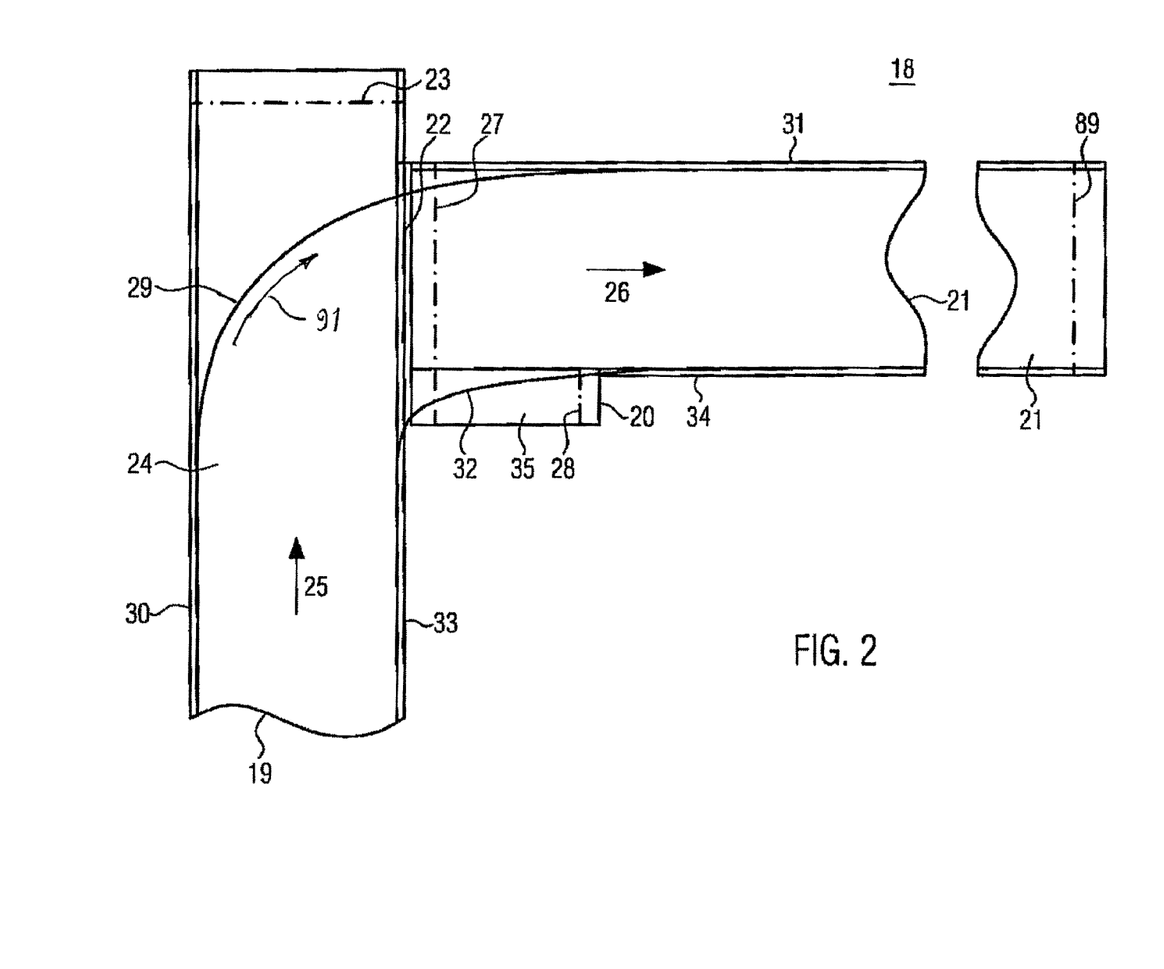
FIG. 2 shows a schematic view of an embodiment of a deflection device with a downstream assist conveyor.

FIG. 2 shows an embodiment of a deflection device 18 comprising an upstream conveyor 19, a downstream assist conveyor 20, and a downstream conveyor 21. A spacing 22 respectively exists between the upstream conveyor 19 and the downstream assist conveyor 20 or the downstream conveyor 21, respectively, which results from the structural circumstances of the downstream assist conveyor 20 or the downstream conveyor 21, respectively. The downstream assist conveyor 20 and the downstream conveyor 21 are configured as circulating endless belts or endless chains having a finite bending radius in the region of a deflection axle 27.

It can also be provided, for example, that the downstream conveyor 21 is composed of several modules or belts disposed alongside and connected to each other that form a contiguous surface and are collectively referred to as a downstream conveyor 21.

If chains are used, then the smaller the chain pitch, the smaller the spacing 22 can be, since the bending radius of the chain is then correspondingly small and downstream conveyor 21 or the downstream assist conveyor 20, respectively, can be positioned close to the upstream conveyor 19.

In the illustration, the upstream conveyor 19 is driven via a drive axle 23, so that objects are transported on a transport surface 24 of the upstream conveyor in a first direction of transport 25. The elements necessary for driving, such as a motor and the like, together with the drive shaft 23, are also referred to as a drive device. The second axle, around which the endless belt or chain of the upstream conveyor 19 runs, is not shown in FIG. 2.

The downstream conveyor 21 and the downstream assist conveyor 20 are disposed at a right angle to the upstream conveyor 19 and transport objects deflected and transferred from the upstream conveyor 19 in a second direction of transport 26 which runs perpendicular to the first direction of transport 25. The downstream conveyor 21 can there likewise be a circulating endless belt or a chain. The downstream conveyor 21 is in the illustration driven via a respective drive axle 89. The second axle of the downstream conveyor 21, around which the endless belt or the chain runs, is in FIG. 2 shown as a common deflection axle 27 with the downstream assist conveyor 20. The downstream assist conveyor 20 is configured as an endless belt or as a chain and can be driven, for example, via a drive axle 28. The belt or the chain likewise runs over the common defection axle 27.

At least one sprocket is attached on this deflection axle 27 in the tension area of the downstream conveyor 21. This provides a torque at the deflection axle 27 that is by a gear ratio (not shown) coupled to the drive axle 28 of the downstream assist conveyor 20.

It can also be provided that the downstream conveyor 20 is driven independently of the drive axle 89 of the downstream conveyor 21 or independently of the common deflection axle 27, respectively, for example, by use of an assist motor.

Objects transported by the upstream conveyor 19 in the first direction of transport 25 arrive at an outer rail 29 whereby the objects are guided to the downstream conveyor 21 and possibly to the downstream assist conveyor 20. The outer rail 29 extends from an outer side 30 of the upstream conveyor 19 to an outer side 31 of the downstream conveyor 21, and there runs above the transport surface 24 of the upstream conveyor 19. In some arrangements, the outer rail 29 is configured as being co-traveling at a velocity 91 that is equal to the transport velocity of the upstream conveyor 19.

The inner rail 32 extends from an inner side 33 of the upstream conveyor 19 to an inner side 34 of the downstream conveyor 21, and there runs above the transport surface 35 of the downstream assist conveyor 20. The inner rail 32 ensures that objects are guided from the transport surface 35 of the downstream assist conveyor 20 to the downstream conveyor 21.

This embodiment of the deflection device 18 for transporting objects therefore results in a conveying surface for the objects extending between the outer rail 29 and the inner rail 32 and comprising portions of the transport surface 24 of the upstream conveyor 19, portions of the transport surface 35 of the downstream assist conveyor 20, and portions of the transport surface of the downstream conveyor 21.

Figure 3:
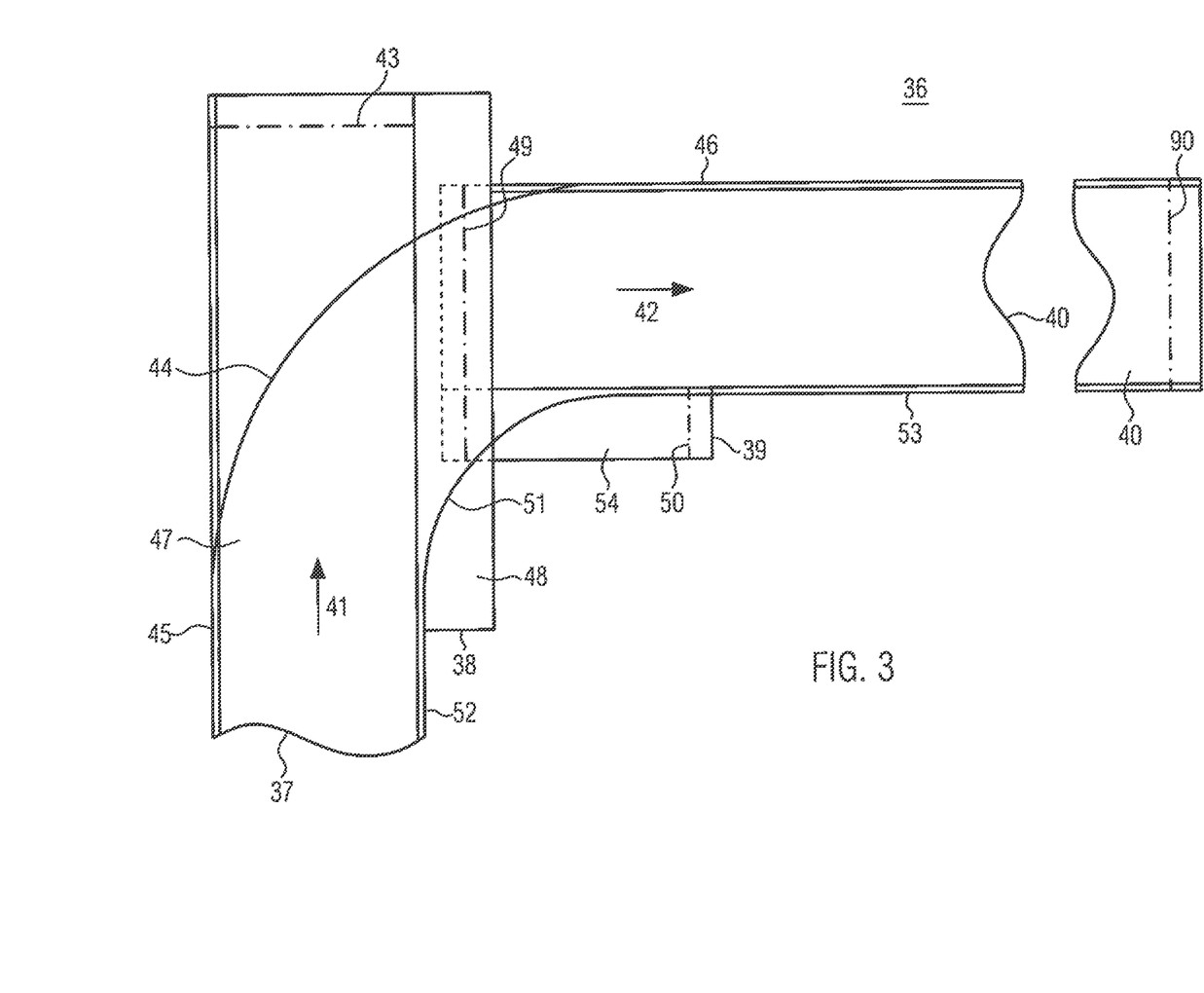
FIG. 3 shows a schematic view of an embodiment of a deflection device with a static transfer plate and a downstream assist conveyor.

FIG. 3 shows an embodiment of a deflection device 36 comprising an upstream conveyor 37, a static transfer plate 38, a downstream assist conveyor 39, and a downstream conveyor 40. The static transfer plate 38 is provided, so that a spacing between the upstream conveyor 37 and the downstream conveyor 40 and the downstream assist conveyor 39 can be bridged by the static transfer plate 38. Such bridging is needed or desirable, for example, for objects with a small bearing surface and/or a downstream conveyor 40 or a downstream assist conveyor 39, respectively, that have no small bending radius, so that objects do not get stuck and/or fall over or the like in the area of the spacing otherwise existing and thereby complicate or prevent continuous transportation and continuous deflection of objects. The static transfer plate 38 advantageously has a width that is smaller than the smallest linear extension of the base area of the objects to be transported, so that no stopping of objects on the transfer plate 38 occurs.

The upstream conveyor 37 can there be a circulating endless belt or a chain. The upstream conveyor 37 is in the illustration driven via a drive axle 43. The second axle, around which the endless belt or the chain of the upstream conveyor 37 runs, is not shown in FIG. 3. Objects transported by the upstream conveyor 37 in the first direction of transport 41 arrive at the outer rail 44, whereby the objects are guided via the static transfer plate 38 to the downstream conveyor 40 and possibly to the downstream assist conveyor 39. The outer rail 44 extends from an outer side 45 of the upstream conveyor 37 to an outer side 46 of the downstream conveyor 40, and there runs above the transport surface 47 of the upstream conveyor 37 and above the transport surface 48 of the transfer plate 38.

The downstream conveyor 40 and the downstream assist conveyor 39 are disposed at a right angle to the upstream conveyor 37 and transport objects deflected and transferred by the transfer plate 38 in a second direction of transport 42 which runs perpendicular to the first direction of transport 41. The downstream conveyor 40 can there likewise be a circulating endless belt or a chain. The downstream conveyor 40 is in the illustration driven via a respective drive axle 54. The downstream assist conveyor 39 is configured as an endless belt or as a chain and can be co-driven via the common deflection axle 49 of the downstream conveyor 40 and the downstream assist conveyor 54.

At least one sprocket is attached to this deflection axle 49 in the tension area of the downstream conveyor 40. This provides a torque at the deflection axle 49 that is by a gear ratio (not shown) coupled to the drive axle 50 of the downstream assist conveyor 54. It can also be provided that the downstream conveyor 39 is driven independently of the drive axle 90 of the downstream conveyor 40, for example, by use of an assist motor.

The inner rail 51 extends from an inner side 52 of the upstream conveyor 37 to an inner side 53 of the downstream conveyor 40, and there runs above the transport surface 48 of the transfer plate 38 and the transport surface 54 of the downstream assist conveyor 39. The inner rail 51 ensures that objects are guided from the transport surface 54 of the downstream assist conveyor 39 onto the downstream conveyor 40.

This deflection device 36 for transporting objects therefore comprises a conveying surface for the objects extending between the outer rail 44 and the inner rail 51 and comprising portions of the transport surface 47 of the upstream conveyor 37, portions of the transport surface 48 of the transfer plate 38, portions of the transport surface 54 of the downstream assist conveyor 39 and portions of the transport surface of the downstream conveyor 40.

Figure 4:
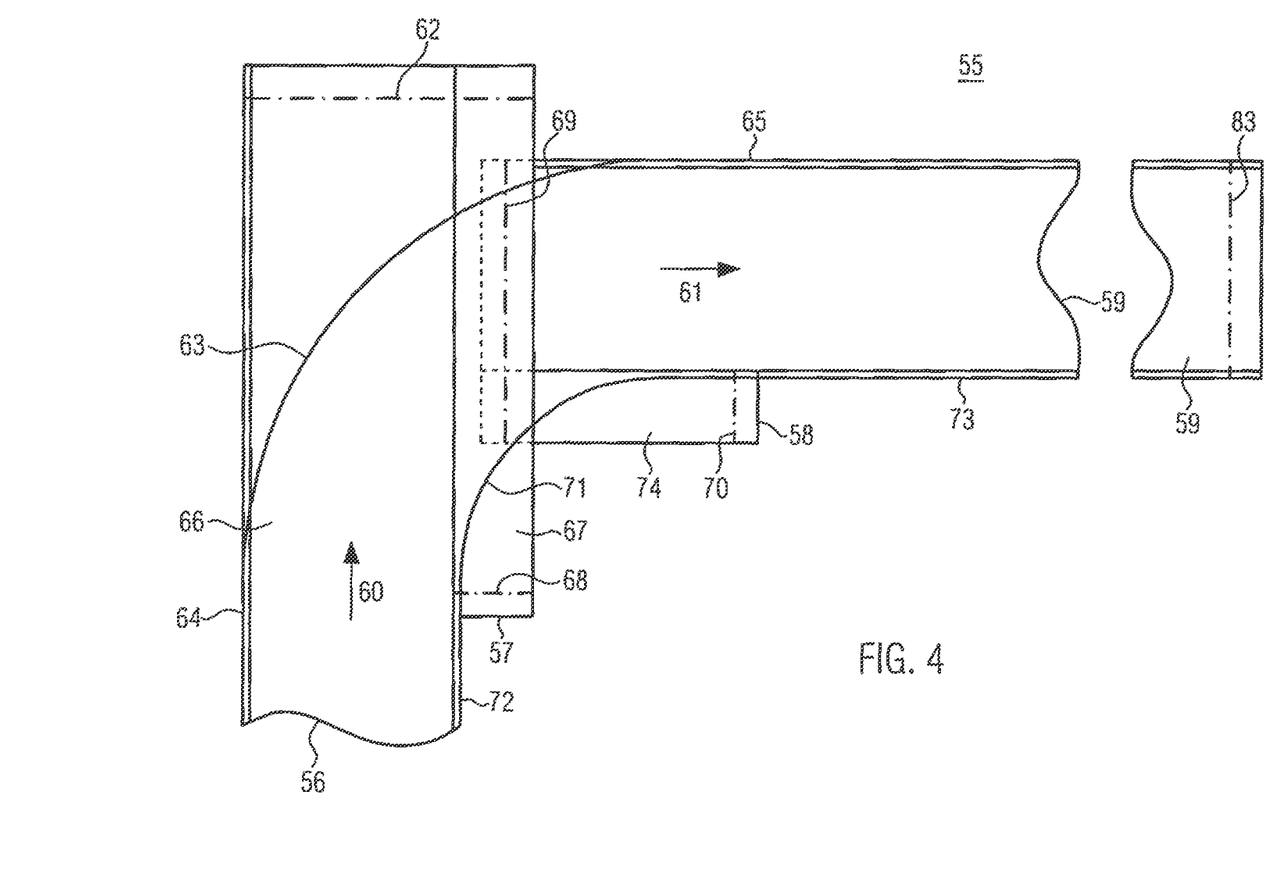
FIG. 4 shows a schematic view of an embodiment of a deflection device with an upstream and a downstream assist conveyor.

FIG. 4 shows a schematic view of an embodiment of a deflection device 55 comprising an upstream conveyor 56, an upstream assist conveyor 57, a downstream assist conveyor 58, and a downstream conveyor 59.

The upstream conveyor 56 can there be a circulating endless belt or a chain. The upstream conveyor 56 is in the illustration driven via a drive axle 62. The second axle, around which the endless belt or the chain of the upstream conveyor 56 runs, is not shown in FIG. 4. Objects transported by the upstream conveyor 56 onto the transport surface 66 in the first direction of transport 60 arrive at the outer rail 63, whereby the objects are guided via the upstream assist conveyor 57 to the downstream conveyor 59 and possibly to the downstream assist conveyor 58. The outer rail 63 extends from an outer side 64 of the upstream conveyor 56 to an outer side 65 of the downstream conveyor 59, and there runs above the transport surface 66 of the upstream conveyor 56 and above the transport surface 67 of the upstream assist conveyor 57. The upstream assist conveyor 57 is configured as an endless belt or as a chain and can be co-driven via the drive axle 62 of the upstream conveyor 56. The belt or the chain, respectively, also runs over a second axle 68. It can also be provided that the upstream assist conveyor 57 is driven independently of the drive axle 62 of the upstream conveyor 56, for example, by use of an assist motor.

The upstream assist conveyor 57 is provided for enabling objects to be transferred from the upstream conveyor 56 to the downstream conveyor 59 or the downstream assist conveyor 58, respectively, so that a spacing between the upstream conveyor 56 and the downstream conveyor 59 and the downstream assist conveyor 58 is bridged by the upstream assist conveyor 57. The downstream conveyor 59 and the downstream assist conveyor 58 are disposed at a right angle to the upstream conveyor 56 and the upstream assist conveyor 57 and transport deflected objects in a second direction of transport 61 which runs perpendicular to the first direction of transport 60. The downstream conveyor 59 can there likewise be a circulating endless belt or a chain. The downstream conveyor 59 is in the illustration driven via a respective drive axle 83. The downstream assist conveyor 58 is configured as an endless belt or as a chain and can be co-driven via the common deflection axle 69 of the downstream conveyor 59 and the downstream assist conveyor 58.

At least one sprocket is attached to this deflection axle 69 in the tension area of the downstream conveyor 59. This provides a torque at the deflection axle 69 that is by a gear ratio (not shown) coupled to the drive axle 70 of the downstream assist conveyor 58. It can also be provided that the downstream conveyor 58 is driven independently of the drive axle 69 of the downstream conveyor 59, for example, by use of an assist motor.

The inner rail 71 extends from an inner side 72 of the upstream conveyor 56 to an inner side 73 of the downstream conveyor 59, and there runs above the transport surface 67 of the upstream assist conveyor 57 and the transport surface 74 of the downstream assist conveyor 58. The inner rail 71 ensures that objects are guided from the transport surface 74 of the downstream assist conveyor 58 onto the downstream conveyor 59.

The deflection device 55 for transporting objects comprises a conveying surface for the objects extending between the outer rail 63 and the inner rail 71 and comprising portions of the transport surface 66 of the upstream conveyor 56, portions of the transport surface 67 of the upstream assist conveyor 57, portions of the transport surface 74 of the downstream assist conveyor 58, and portions of the transport surface of the downstream conveyor 59.

Figure 5:
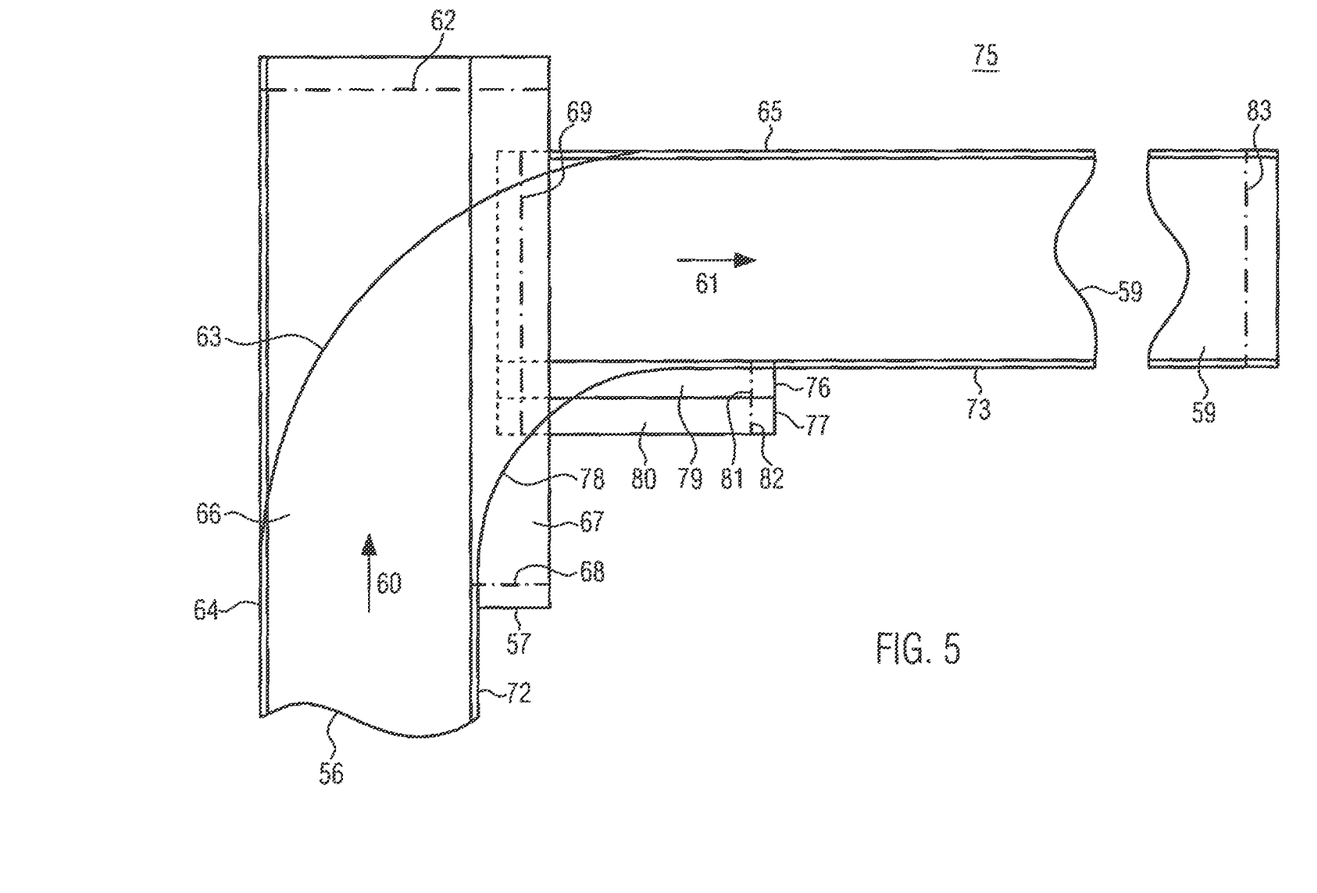
FIG. 5 shows a schematic view of an embodiment of a deflection device with an upstream and two downstream assist conveyors.

FIG. 5 shows an embodiment of a deflection device 75 which substantially corresponds to the embodiment of FIG. 4. However, two downstream assist conveyors 76, 77 are present instead of one downstream assist conveyor. The two downstream assist conveyors 76, 77 are there also arranged such that they extend partially below the upstream assist conveyor 57. The use of two downstream assist conveyors 76, 77 enables even better object deflection from the first direction of transport 60 to the second direction of transport 61 because a larger radius for the inner rail 78 can be chosen. The inner rail 78 extends from an inner side 72 of the upstream conveyor 56 to an inner side 73 of the downstream conveyor 59, and there runs above the transport surface 67 of the upstream assist conveyor 57, the transport surface 79 the first downstream assist conveyor 76, and the transport surface 80 of the second downstream assist conveyor 77.

One or both downstream assist conveyors 76, 77 can be driven by the deflection axle 69 of the downstream conveyor 59. However, it can also be provided that one or both downstream assist conveyors 76, 77 are driven independently of the deflection axle 69 of the downstream conveyor 59, for example, by use of one or more assist motors. Also different transport velocities can be selected for the two downstream conveyors 76, 77. The two downstream assist conveyors 76, 77 additionally each run over further axles 81, 82.

A conveying surface of this deflection device 75 for transporting containers results for transporting objects extending between the outer rail 63 and the inner rail 78 and comprising portions of the transport surface 66 of the upstream conveyor 56, portions of the transport surface 67 of the upstream assist conveyor 57, portions of the transport surface 79 of the first downstream assist conveyor 76, portions of the transport surface 80 of the second downstream assist conveyor 77, and portions of the transport surface of the downstream conveyor 59.

Figure 6:
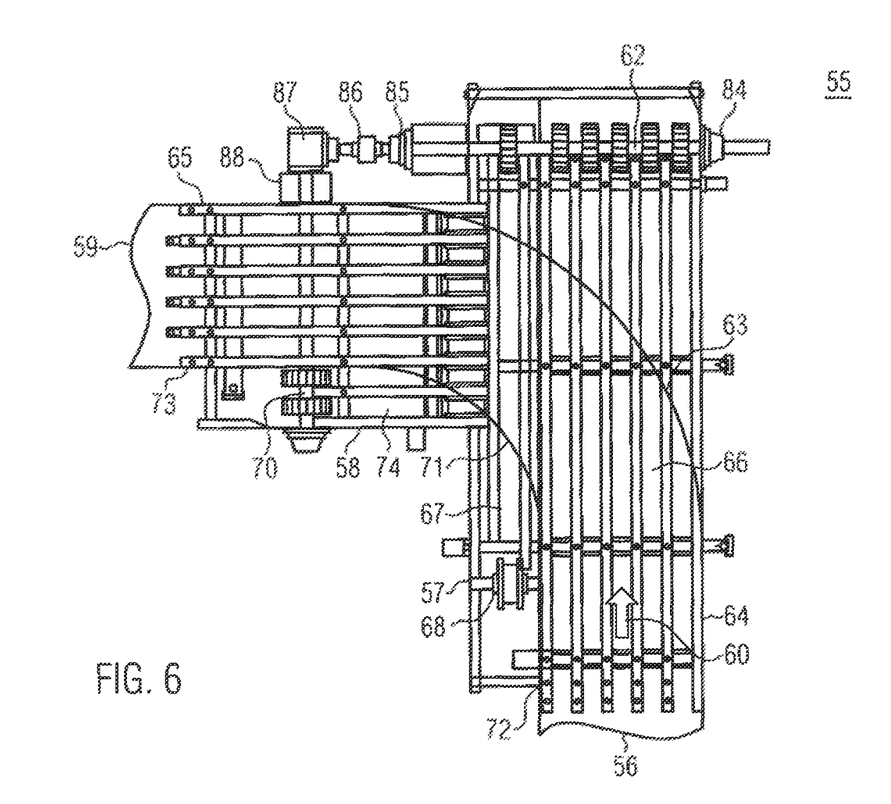
FIG. 6 shows a schematic view of an embodiment of a deflection device with a drive coupling of the downstream assist conveyor to an upstream conveyor.

FIG. 6 shows an embodiment of a deflection device 55 which substantially corresponds to the embodiment of FIG. 4. However, a drive coupling of the downstream assist conveyor 58 with the upstream conveyor 56 is given instead of a drive coupling of the downstream assist conveyor 58 with the downstream conveyor 59. The drive axle 62 of the upstream conveyor 56 is there used as a source of torque. An angular gear 87 is by use of a positive- or force-fit tap flush-mounted on the extension of the drive shaft 62. In order for possible misalignments to have no effect on the bearing 84, 85 of the drive axle 62, a shaft coupling is advantageously positioned between the axle extension of the drive axle 62 and the input side of the angular gear 87. The drive axle 70 of the downstream assist conveyor 58 is on the output side driven by the angular gear 87. This enables a compact and advantageous design.

For an optimized transmission ratio, the ratio is located in the range between 1:1 to 1:2, preferably between 1:1 to 1:1.5.

Furthermore, one side of the shaft bearing of the drive axle 70 of the downstream assist conveyor 58 can be combined with a torque support 88; preferably the shaft bearing is mounted directly on the torque support 88.

What is claimed is:

1. A deflection device for deflecting objects, comprising:
an upstream conveyor which is adapted to transport objects on a first transport surface in a first direction of transport and to transfer them to a downstream conveyor;
said downstream conveyor is adapted to transport objects on a second transport surface in a second direction of transport, said first direction of transport and said second direction of transport are aligned perpendicular to each other and said first transport surface and said second transport surface are substantially coplanar;
a downstream assist conveyor which is adapted to transport objects on a third transport surface in said second direction of transport, said downstream assist conveyor is disposed alongside of said downstream conveyor and on one side towards said upstream conveyor, said second transport surface and said third transport surface are coplanar; and
a first drive device of said downstream assist conveyor, where a drive shaft of the upstream conveyor is used for coupling a torque of said downstream assist conveyor, where an extension of one end of the drive shaft is provided beyond a bearing, and where the extension is via an angular gear connected to the first drive device of the downstream assist conveyor.

2. The deflection device according to claim 1, where a first width of the downstream assist conveyor is smaller by 50% to 85% than a second width of said downstream conveyor.

3. The deflection device according to claim 1, where a first length of the downstream assist conveyor is 5% to 30%, of a second length of said downstream conveyor.

4. The deflection device according to claim 1, further comprising a first drive device of the downstream assist conveyor which is coupled to a deflection axle of the downstream conveyor by a gear ratio in a range of 1:1 to 1:2.

5. The deflection device according to claim 4, further comprising a second drive device of the downstream conveyor, where said second drive device and the deflection axle are arranged such that said second transport surface comprised by said downstream conveyor is drawn by said second drive device in said second direction of transport, at least one sprocket is disposed on said deflection axle, and a torque thereby provided is, by the gear ratio, coupled to the first drive device of the downstream assist conveyor.

6. The deflection device according to claim 1, where the deflection device comprises a second downstream assist conveyor adapted to transport objects on a fifth transport surface in the second direction of transport, where said second downstream assist conveyor is disposed alongside of the first downstream assist conveyor and on one side towards the upstream conveyor, said second transport surface and said fifth transport surface being coplanar.

7. The deflection device according to claim 1, further comprising a static transfer plate in an area between the upstream conveyor with the downstream assist conveyor and the downstream conveyor.

8. The deflection device according to claim 1, further comprising an upstream assist conveyor which is adapted to transport objects on a fourth transport surface in the said first direction of transport, where said upstream assist conveyor is disposed alongside of the upstream conveyor and on one side towards the downstream conveyor, the first transport surface and said fourth transport surface being coplanar.

9. The deflection device according to claim 1, further comprising an inner rail extending from an inner side of the upstream conveyor to an inner side of the downstream conveyor.

10. The deflection device according to claim 9, where the inner rail has the shape of a circular arc.

11. The deflection device according to claim 1, further comprising an outer rail extending from an outer side of the upstream conveyor to an outer side of the downstream conveyor.

12. The deflection device according to claim 11, where the outer rail is configured as being co-traveling, at a velocity that is equal to a transport velocity of said upstream conveyor.

13. A method for deflecting objects, comprising:
transporting one or more of a group including containers, bottles, jars, cans through a deflection device according to claim 1.

14. The deflection device according to claim 11, the outer rail having the shape of a circular arc.

15. A deflection device for deflecting objects, comprising:
an upstream conveyor which is adapted to transport objects in a first direction of transport and is driven via a first drive axle,
an upstream assist conveyor, the upstream assist conveyor being disposed alongside of the upstream conveyor and on one side towards a downstream conveyor and a downstream assist conveyor, and being co-driven via the first drive axle, the downstream conveyor which is driven via a second drive axle, and the downstream assist conveyor which is co-driven via a common deflection axle of the downstream conveyor and the downstream assist conveyor, wherein the downstream conveyor and the downstream assist conveyor are disposed at a right angle to the upstream conveyor and the upstream assist conveyor and are adapted to transport the objects in a second direction of transport which runs perpendicular to the first direction of transport.

16. The deflection device according to claim 15, the upstream assist conveyor being configured as a circulating endless belt or as a chain.

17. The deflection device according to claim 15, the upstream conveyor being configured as a circulating endless belt or as a chain.

18. The deflection device according to claim 15, the downstream assist conveyor being configured as a circulating endless belt or as a chain.

19. The deflection device according to claim 15, the downstream conveyor being configured as a circulating endless belt or as a chain.

* * * * *